United States Patent [19]

Ishimaru et al.

[11] 4,237,251
[45] Dec. 2, 1980

[54] POLYESTERAMIDES AND PROCESS FOR PRODUCING THE SAME

[75] Inventors: Toshiaki Ishimaru, Hitachi; Hiroshi Nishizawa, Kitaibaraki; Yuichi Osada, Hitachi, all of Japan

[73] Assignee: Hitachi Chemical Company, Ltd., Japan

[21] Appl. No.: 2,752

[22] Filed: Jan. 11, 1979

[30] Foreign Application Priority Data

| Jan. 12, 1978 | [JP] | Japan | 53-2452 |
| Feb. 27, 1978 | [JP] | Japan | 53-21713 |
| Feb. 27, 1978 | [JP] | Japan | 53-21714 |
| Mar. 1, 1978 | [JP] | Japan | 53-23401 |
| Mar. 29, 1978 | [JP] | Japan | 53-36980 |

[51] Int. Cl.³ ............... C08G 63/76; C08L 67/02
[52] U.S. Cl. ............... 525/440; 428/425.8; 525/419; 525/444; 528/288
[58] Field of Search ............ 528/288; 525/419, 440; 428/423

[56] References Cited

U.S. PATENT DOCUMENTS

| 3,928,290 | 12/1975 | Cohen et al. | 528/288 |
| 4,018,736 | 4/1977 | Fabian et al. | 260/29.2 N |
| 4,117,032 | 9/1978 | Kwiecinski | 528/288 X |
| 4,121,266 | 10/1978 | Kovacs et al. | 528/288 |
| 4,165,307 | 8/1979 | Mizuno et al. | 525/440 X |
| 4,169,825 | 10/1979 | Yapp et al. | 525/440 X |

*Primary Examiner*—Lucille M. Phynes
*Attorney, Agent, or Firm*—Craig and Antonelli

[57] ABSTRACT

Polyesteramides produced by reacting in the first step an aromatic monoalkyl dicarboxylate with an aromatic diisocyanate in the presence or absence of one or more monoalkyl dicarboxylates and/or diisocyanates to produce an aromatic dialkyl diamidedicarboxylate of the formula:

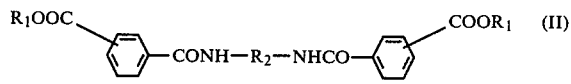

wherein $R_1$ is alkyl; and $R_2$ is a divalent aromatic residue, or a mixture of dialkyl diamidedicarboxylates containing the compound of the formula (II), and reacting in the second step the compound of the formula (II) or the mixture containing the compound of the formula (II) with one member selected from the group consisting of (a) one or more polyhydric alcohols,
(b) one or more polyhydric alcohols and polyvalent carboxylic acids, and
(c) one or more polyhydric alcohols and a linear polyester have improved heat resistance as well as excellent mechanical properties and can be used, e.g., for enamelled wire.

22 Claims, No Drawings

POLYESTERAMIDES AND PROCESS FOR PRODUCING THE SAME

This invention relates to polyesteramides, polyesteramideimides having improved properties and a process for producing the same, and to an electrical insulating composition containing said polyesteramide, and an electrical conductor having an insulating coating produced from said electrical insulating composition.

Polyester varnishes are widely used as electrical insulating varnishes, particularly varnishes for enamelled wire, because of their relatively balanced properties in mechanical properties, electrical properties, heat resistance and the like. But recent demands for miniaturization and weight saving of electrical equipment require enamelled wire to have better heat resistance than before.

As varnishes for enamelled wire having good heat resistance, there are polyimide varnish and polyamideimide varnish having high heat resistance, but the resins by themselves are very expensive and provide a serious problem in production cost and the like. On the other hand, in order to improve heat resistance of polyester varnishes for enamelled wire, there have been proposed varnishes of polyesterimides having imide groups or polyesteramides having amide groups.

Polyesterimides are improved in heat life properties and resistance to thermal shock but rather lowered in mechanical properties, particularly in abrasion resistance comparing with polyesters.

Polyesteramides are slightly inferior in heat life properties and resistance to thermal shock to the polyesterimides but by far superior to the polyesters. Abrasion resistance of the polyesteramides are better than that of the polyesterimides and polyesters. Therefore, considering the balance of properties totally, the polyesteramides are more preferably than the polyesterimides except for the case wherein very high heat resistance is required. But the introduction of amide groups into polyesters provides various problems technically and economically comparing with the case of the introduction of imide groups to yield polyesterimides, polyesteramide varnishes are not practically used yet.

Polyesteramide-imides are known to have the properties of both of polyesterimides and polyesteramides. But since there are various problems in the introduction of amide groups technically and economically comparing with the case of the introduction of imide groups to yield polyesterimides, only a little amount of polyesteramideimides are used as varnishes.

Generally speaking, when amide groups are introduced into polyesters to give polyesteramides for enamelled wire, amide groups having aromatic structures provide better results in heat resistance. Thus, there have been proposed processes for producing amidedicarboxylic acids or their esters by reacting an acid chloride with an amine, e.g. a process for reacting an aromatic dicarboxylic acid dichloride with an aromatic monocarboxylic acid monoamine (Japanese Patent Appln. Kokoku (Post-Exam Publn.) No. 27823/71), a process for reacting an aromatic dicarboxylic acid monochloride monoester with an aromatic diamine (Japanese Patent Appln. Kokoku (Post-Exam Publn.) No. 12621/69), etc. But, since aromatic acid chlorides are expensive and require much care for handling, these processes are not preferable for industrial production of polyesteramides. On the other hand, there have been proposed a process for producing an amidedicarboxylic acid or its ester by reacting an aromatic dicarboxylic acid or its diester with an aromatic diamine (Japanese Patent Appln. Kokoku (Post-Exam Publn.) No. 14229/70) and a process for producing an amidedicarboxylic acid by reacting an aromatic dicarboxylic acid with an aromatic diisocyanate (Japanese Patent Appln. Kokoku (Post-Exam Publn.) No. 7032/73). In the former process, however, it is difficult to produce the amidedicarboxylic acid in good yield and unreacted amino groups are retained in large amounts and consequently properties of the resin is lowered. Further, in the latter process, there is also by-produced a polyamidedicarboxylic acid of the formula:

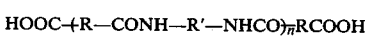

wherein R and R' are independently a divalent aromatic residue; and n is an integer of 2 or more, which has poor solubility and very low reactivity and an insoluble part retained brings about gelation or partial gelation during the synthesis of a polyesteramide resin; this is not desirable in the synthesis of polyesteramides.

It is an object of this invention to provide a process for producing polyesteramides or polyesteramideimides having improved heat resistance as well as excellent mechanical properties, heat life properties, resistance to thermal shock, etc. without bringing about gelation during the synthesis.

This invention provides a process for producing a polyesteramide or a polyesteramide-imide which comprises:

(i) reacting one or more aromatic monoalkyl dicarboxylates of the formula:

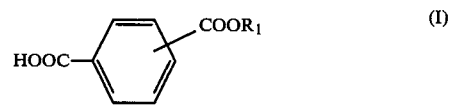

wherein $R_1$ is alkyl; with one or more aromatic diisocyanates in the presence or absence of one or more monoalkyl dicarboxylates and/or one or more diisocyanates to produce an aromatic dialkyl diamidedicarboxylate of the formula:

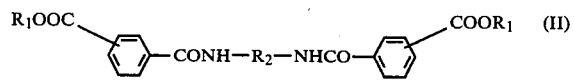

wherein $R_1$ is as defined above; and $R_2$ is a divalent aromatic residue, or to produce a mixture (III) of dialkyl diamidedicarboxylates containing the aromatic dialkyl diamidedicarboxylate of the formula (II), and (ii) reacting the aromatic dialkyl diamidedicarboxylate of the formula (II) or a mixture (III) of dialkyl diamidedicarboxylates containing the aromatic dialkyl diamidedicarboxylate of the formula (II) with one member selected from the group consisting of (a) one or more polyhydric alcohols, (b) one or more polyhydric alcohols and one or more polyvalent carboxylic acids, and (c) one or more polyhydric alcohols and a linear polyester.

This invention also provides a polyesteramide (including polyesteramide-imide) thus produced, an electrical insulating composition containing said polyesteramide, and an electrical conductor having an insulating coating produced from said electrical insulating composition.

According to the process of this invention, no insoluble material is retained or no partial gelation takes place during the synthesis, and further no sublimation of the acid component such as dimethyl terephthalate takes place during the esterification reaction, i.e. the second step reaction, and since the esterification proceeds by an ester interchange reaction, a reaction time is very short.

In the first step, the following reaction takes place between the aromatic monoalkyl dicarboxylate of the formula (I) and the aromatic diisocyanate:

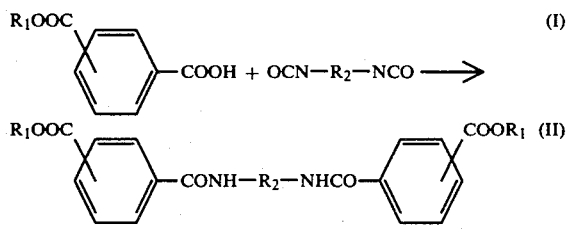

wherein $R_1$ and $R_2$ are as defined above, in the presence or absence of a solvent.

When an acidic solvent such as xylenol, cresol, phenol, etc. is used, it is necessary to use a basic catalyst such as N-methylpyrrolidone, dimethylaniline, dimethylformamide, dimethylacetamide, etc. When a neutral solvent such as xylene, toluene, ethylbenzene, etc. is used, it is preferable to use a basic catalyst as mentioned above. When a basic solvent such as N-methylpyrrolidone, dimethylaniline, dimethylformamide, dimethylacetamide, etc. is used, it is not always necessary to use a catalyst. A mixture of two or more solvents can also be used. It is preferable to use 0.5 part by weight or more of a catalyst, more preferably 10–200 parts by weight (including a solvent) per 100 parts by weight of the aromatic diisocyanate.

The reaction is preferably carried out at 80° C. to 240° C. Since the reaction accompanys decarbonation, it is preferable to raise the reaction temperature gradually from room temperature to the desired reaction temperature.

In the aromatic monoalkyl dicarboxylate of the formula (I), $R_1$ is an alkyl group having 1 to 6 carbon atoms such as methyl, ethyl, propyl, butyl, hexyl, etc. Examples of the aromatic monoalkyl dicarboxylate of the formula (I) are monomethyl terephthalate, monomethyl isophthlate, monoethyl terephthalate, monoethyl orthophthalate, and the like.

Considering the esterification reaction between the aromatic dialkyl diamidedicarboxylate of the formula (II) produced from the compound of the formula (I) or a mixture (III) of dialkyl diamidedicarboxylates containing the aromatic dialkyl diamidedicarboxylate of the formula (II) and an alcohol component, if desired in the presence of other acids, the alkyl group represented by $R_1$ in the formula (I) being methyl or ethyl is very preferable from the viewpoints of a fast ester interchange rate in the esterification reaction and a fast evaporation rate of the alcohol eliminated by the condensation. In addition, from the viewpoint of heat resistance, as the aromatic monoalkyl dicarboxylate, monoalkyl ester of terephthalate or isophthalate is preferable. Particularly, monomethyl or monoethyl terephthalate or monomethyl or monoethyl isophthalate is preferable.

Examples of the aromatic diisocyanates are 4,4'-diphenylmethane diisocyanate, tolylene diisocyanate, xylylene diisocyanate, and their block isocyanates such as xylenol block compound of 4,4'-diphenylmethane diisocyanate, e.g. Desmodur MS-60 (manufactured by Japan Polyurethane Industried, Ltd.), etc.

The reaction can be carried out in the presence of one or more other comonomers such as monoalkyl dicarboxylates and/or diisocyanates, if desired, to yield a mixture (III).

Examples of the monoalkyl dicarboxylates are aliphatic monoalkyl dicarboxylates such as monomethyl adipate, monomethyl succinate, etc.; alicyclic monoalkyl dicarboxylates such as monomethyl hexahydroterephthalate, monoethylhexahydroisophthalate, etc.

Examples of other diisocyanates are aliphatic diisocyanates such as hexamethylene diisocyanate, etc., alicyclic diisocyanates such as isophorone diisocyanate, etc.

From the viewpoint of heat resistance, it is preferable to use the aromatic compounds in proportion of 70 equivalent % or more. Further, from the viewpoint of heat resistance, it is preferable to use one or more other comonomers such as aliphatic monoalkyl dicarboxylates, alicyclic monoalkyl dicarboxylates, aliphatic diisocyanates, or alicyclic diisocyanates so that the amount of the aromatic dialkyl diamidedicarboxylate of the formula (II) in the mixture (III), i.e. a mixture of dialkyl diamidedicarboxylates containing the aromatic dialkyl diamidedicarboxylate of the formula (II), becomes 30% by more or more.

In the case of using 4,4'-diphenylmethane diisocyanate, tolylene diisocyanate or xylylene diisocyanate as the aromatic diisocyanate, $R_2$ in the compound of the formula (II) represents a diphenylmethane, tolylene, or xylylene group.

The reaction for producing the compound of the formula (II) or the mixture (III) is carried out by using 1 mole of diisocyanate component and 2 moles of monoalkyl dicarboxylate component, but the reaction can be carried out by using a little excess of the diisocyanate component. In such a case, a small amount of free isocyanate groups are contained in the reaction product. These free isocyanate groups react with one or more polyvalent carboxylic acids or polyhydric alcohols in the second step to give amide bonds or urethane bonds. But when the reaction in the first step is carried out in the presence of a large excess of the diisocyanate component, a large amount of unreacted diisocyanate is retained in the reaction product of the first step. In such a case, if the second step reaction is carried out as it is, a large amount of urethane bonds will be produced in the resulting resin, which results in undesirably lowering heat resistance of enamelled wire coated with said resin to some extent. Further when a dicarboxylic acid is added in the second step reaction, it may react with the unreacted diisocyanate to give insoluble material until gelation point is reached. Therefore it is preferable to use 1.5 moles or more of the monoalkyl dicarboxylate component, more preferably 1.9 to 2.0 moles, per mole of the diisocyanate component.

On the other hand, more than 2 moles of the monoalkyl dicarboxylate component can be used per mole of the diisocyanate component in the first step reaction, and excess carboxylic acid component can be used as another carboxylic acid component in the second step reaction.

The aromatic dialkyl diamidedicarboxylate of the formula (II) or the mixture (III) obtained in the first step reaction can be used as it is, or can be used after extracting with an organic solvent such as methanol, ethanol, etc. for the second step reaction, e.g. an esterification reaction.

The second step reaction for producing the desired polyesteramides is a reaction of the aromatic dialkyl diamidedicarboxylate of the formula (II) or the mixture (III) with one member selected from the group consisting of (a) one or more polyhydric alcohols, (b) one or more polyhydric alcohols and one or more polyvalent carboxylic acids, and (c) one or more polyhydric alcohols and a linear polyester.

Examples of polyhydric alcohols in the components (a), (b) or (c) are dihydric alcohols such as ethylene glycol, diethylene glycol, neopentyl glycol, 1,4-butanediol, 1,6-hexanediol, 1,4-cyclohexanedimethanol, etc.; tri- or higher polyhydric alcohols such as glycerin, trimethylolpropane, tris(2-hydroxyethyl)isocyanurate, pentaerythritol, etc.

Among them, tris(2-hydroxyethyl)isocyanurate (hereinafter referred to as "THEIC") is preferable from the viewpoint of heat solftening properties. Further, from the viewpoint of heat resistance, it is preferable to use tri- or higher polyhydric alcohol in amount of 30 equivalent % or more based on the total amount of the alcohol component. Particularly, it is preferable to use tris(2-hydroxyethyl)isocyanurate in an amount of 40 equivalent % or more based on the total amount of the polyhydric alcohols. Polyesteramides are usually synthesized under an excess of the alcohol component, so that the alcohol surplus percentage is preferably in the range of 5-80 equivalent % based on the amount of the acid component.

A preferable reaction temperature is in the range of 160°-250° C. in the case of (a), but since heat resistance of THEIC as a monomer state is not so good, the temperature of 210° C. or less is more preferable.

As the acid component in the second step estrification reaction, the aromatic dialkyl diamidedicarboxylate of the formula (II) or the mixture (III) alone can be used as in the case of (a), or one or more polyvalent carboxylic acids generally used for varnishes for enamelled wire can be used theretogether as in the case of (b).

Examples of the polyvalent carboxylic acids are terephthalic acid, isophthalic acid, trimellitic acid, succinic acid, adipic acid, etc. and their derivatives such as their esters.

Taking the balance of total properties of enamelled wire such as heat resistance, flexibility, etc. into consideration, it is preferable to use the polyvalent carboxylic acid component containing 80 equivalent % or more of terephthalic acid, isophthalic acid or their derivatives.

In order to give good heat resistance, it is preferable to adjust the amount of the polyvalent carboxylic acids to be added so that the amount of the aromatic dialkyl diamidedicarboxylate of the formula (II) or the mixture (III) become 15 equivalent % or more based on the total amount of the acid component. Particularly better heat resistance can be obtained by using the aromatic dialkyl diamidedicarboxylate of the formula (II) or the mixture (III) in an amount of 15 equivalent % or more based on the total amount of the acid component and THEIC in an amount of 40 equivalent % or more based on the total amount of the alcohol component.

A preferable reaction temperature is in the range of 160°-250° C. in the case of (b), but since heat resistance of THEIC as a monomer is not so good, the temperature of 210° C. or less is more preferable.

As one component of the acid component in the second step esterification reaction, an imidedicarboxylic acid of the formula (IV) can also be preferably used. When the imidedicarboxylic acid is used, a polyesteramide containing imide bonds can be obtained.

The imidedicarboxylic acid can be obtained by reacting, for example, 1 mole of a diamine with about 2 moles of trimellitic anhydride, as disclosed in Japanese Patent Appln. Kokoku (Post-Exam Publn) No. 40113/76, and the product has the following formula:

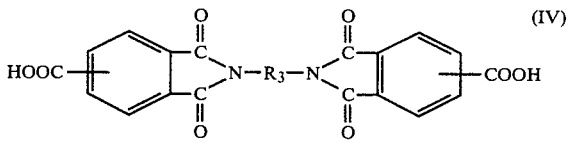

wherein $R_3$ is a divalent organic group such as $-(CH_2)_n-$ ($n=1-8$), a residue of diphenylmethane (removing two hydrogen atoms), m-phenylene, p-phenylene, napthalene, diphenyl ether, etc.

As the diamine used in said reaction, there can be used diaminodiphenylmethane (hereinafter referred to as "DAM"), m-phenylenediamine, p-phenylenediamine, 1,4-diaminonaphthalene, 4,4'-diaminodiphenyl ether, 4,4'-dimethylheptamethylenediamine, hexamethylenediamine, 4,4'-dicyclohexylmethanediamine, diaminodiphenyl sulfone, etc. Needless to say, imidedicarboxylic acids produced from diisocyanates in place of the diamines can also be used. The imidedicarboxylic acids can be produced by any conventional methods.

In order to obtain good heat resistance, it is preferable to use the acid component containing the aromatic dialkyl diamidedicarboxylate of the formula (II) or the mixture (III) in an amount of 10-95 equivalent % and the imidedicarboxylic acid of the formula (IV) in an amount of 5-50 equivalent % based on the total amount of the acid component. Together with the imidedicarboxylic acid of the formula (IV) and the dialkyl diamidedicarboxylate of the formula (II) or the mixture (III), there can be used other acids such as terephthalic acid, isophthalic acid, trimellitic anhydride, dimethyl terephthalate, dimethyl isophthalate, succinic acid, adipic acid or their derivatives.

When the imidedicarboxylic acid is used, the second step esterification reaction is usually carried out in an excess of the alcohol component, and the alcohol surplus percentage is preferably in the range of 5-80 equivalent % based on the amount of the acid component.

In the case of using THEIC as the polyhydric alcohol in the second step reaction and subsequently, if required, other polyhydric alcohol or alcohols and polyvalent carboxylic acid or acids are reacted as one embodiment of the case (b), it is preferable to react 1.3 to 2.0 moles of THEIC with 1 mole of the aromatic dialkyl diamidedicarboxylate of the formula (II) alone or in the mixture (III). If the amount is less than 1.3 moles, since the alcohol surplus percentage is too low, it is possible to take place gelation if the second step reaction proceeds sufficiently. If the amount is more than 2.0 moles, THEIC remains unreacted. The reaction can be carried out in the absence of a solvnet, but a preferable method is to carry out the reaction in the presence of a solvent having a high boiling point such as cresol, N-methyl-pyrrolidone, xylenol, or the like, singly or in combination. Preferable reaction temperature is in the range of 160°–250° C., but since heat resistance of THEIC as a monomer state is no so great, the temperature of 210° C. or less is more preferable. As the catalyst, there can be used tetrabutyl titanate, lead acetate, cobalt naphthenate, di-butyl tin oxide, etc., which are usually used in esterification and ester interchange reactions as catalyst.

From the viewpoint of heat resistance, it is preferable to control the amount of the other polyhydric alcohols added if required in the later stage to 60 equivalent % or less with respect to the total amount of the alcohol component.

The linear polyester used in the case of (c) includes those obtained by condensation reaction of dicarboxylic acids such as terephthalic acid, isophthalic acid, adipic acid, benzophenone dicarboxylic acid, etc., or their derivatives with dihydric alcohols such as ethylene glycol, diethylene glycol, propylene glycol, 1,4-butanediol, neopentyl glycol, 1,4-cyclohexanedimethanol, etc. From the viewpoint of the balance of total properties of enamelled wire such as heat resistance, flexibility, and the like, polymers or copolymers of terephthalic acid, isophthalic acid or their derivatives and ethylene glycol are preferable. In addition, it is preferable to use a linear polyester having a reduced viscosity of 0.2–1.0 measured by using dimethylacetamide as a solvent. Concrete examples of the linear polyesters are poly(ethylene terephthalate) and poly(ethylene isophthalate terephthalate coester), which are produced in industrial scale for the use of fibers, films, molding resins. Scrap pellets of these polyesters obtained during the production or processing thereof can also be used. In order to obtain good heat resistance, it is preferable to control the amount of the linear polyester to be added so that the amount of the aromatic dialkyl diamidedicarboxylate of the formula (II) becomes 10 equivalent % or more based on the total acid component in the linear polyester, or the alcohol surplus percentage of the total of the polyhydric alcohol or alcohols and the alcohol component in the linear polyester becomes 5–80 equivalent % with respect to the total acid component including the aromatic dialkyl diamidedicarboxylate of the formula (II) and the acid component in the linear polyester.

In order to obtain particularly good heat resistance and flexibility, it is preferable to select the proportions of the three components forming the polyesteramide, i.e.

(1) the aromatic dialkyl diamidedicarboxylate of the formula (II) or the mixture (III),
(2) the polyhydric alcohol, and
(3) the linear polyester, as follows:

(1) 10–45% by weight,
(2) 25–45% by weight, and
(3) 65–10% by weight, and the total being 100% by weight.

If the proportion of (1) is less than 10% by weight, sufficient heat resistance (mainly resistance to thermal shock) and abrasion resistance can not be obtained, whereas if the proportion of (1) is more than 45% by weight, flexibility as well as solubility of the polyesteramide produced are lowered. If the proportion of (2) is less than 25% by weight, heat resistance (mainly in cut-through) becomes insufficient, whereas if the proportion is more than 45% by weight, flexibility is lowered. If the proportion of (3) is less than 10% by weight, flexibility is insufficient, whereas if the proportion is more than 65% by weight, heat resistance (mainly in cut-through) is lowered.

In the case of (c) using the linear polyester, it is preferable to react the aromatic dialkyl diamidedicarboxylate of the formula (II) or the mixture (III) with one or more polyhydric alcohols first, and then with the linear polyester. It is also preferable to use THEIC as the polyhydric alcohol. The reaction can be carried but by mixing the aromatic dialkyl diamidedicarboxylate of the formula (II) or the mixture (III), one or more polyhydric alcohols, one or more polyvalent carboxylic acids (if required) and/or the linear polyester, and melting without using a solvent. But a preferable method is to carry out the reaction in a solvent having a high boiling point such as cresol, N-methylpyrrolidone, xylenol, etc., singly or in combination. Preferable reaction temperature is in the range of 160°–250° C.

When the reaction accompanys an additional step of reaction, i.e. so-called third step reaction, for the reaction of the linear polyester, a solvent having a high boiling point such as cresol, N-methylpyrrolidone, xylenol, etc. may be added to the reaction system. Preferable reaction temperature of the third step reaction is in the range of 200°–250° C.

The reaction can preferably be carried out by using a catalyst such as terabutyl titanate, lead acetate, cobalt naphthenate, di-butyl tin oxide, etc., which are usually used in esterification and ester interchange reactions as catalyst.

The polyesteramide resin thus obtained or its solution is diluted with a solvent such as cresol, xylenol, N-methylpyrrolidone, or the like so that the resin content becomes 20–50% by weight. In such a case, as a co-solvent, there can be used xylene, ethylene glycol dimethyl ester, NISSEKI HISOL-100 (trade mark, a mixture of aromatic hydrocarbons, manufactured by Nippon Oil Chemicals Co., Ltd.), Cellosolve Acetate (trademark of ethylene glycol monoethyl monoacetate, manufactured by Dow Chemical Co.) or the like.

The resin solution thus obtained may contain a curing agent usually used for varnishes for enamelled wire such as an organic compound of titanium or aluminum, e.g. tetrabutyl titanate, tetrapropyl titanate, aluminum tris(acetylacetonate), etc. and a surface smoothing agent such as an organic compound of Zn, Co, etc., e.g. zinc napthenate, cobalt naphthenate, etc. Further it may also contain as another curing agent block isocyanate, e.g. Desmodur CT-Stable (manufactured by Japan Polyurethane Industries, Ltd.), etc.

The thus obtained varnish is baked on copper wire and the like by a conventional method to give electrical conductors such as enamelled wire having good heat resistance and abrasion resistance. Further enamelled wire obtained by using the electrical insulating composition of this invention has excellent heat life properties and resistance to thermal shock as shown in the working examples described below.

In the case of manufacturing enamels for electric wire, it is preferable to use the novel polyesteramide of this invention. The polyesteramide of this invention can also be used for producing shaped articles for electrical insulation. That is, it can be used in the form of a solution, which is used for impregnating cloth, paper, asbestos, or the like.

When an electrical insulating composition is produced from the polyesteramide of this invention, it is preferable to add 1–6% by weight of, as the solid, a phenolic resin such as phenol-formaldehyde, cresol-formaldehyde, xylenol-formaldehyde, or the like resin or melamine resin to the composition in terms of the resin content so as to improve heat ageing characteristics in dielectric breakdown voltage of enamelled wire more remarkably.

When 5-100% by weight of, on the solid basis, polyhydantoin such as Resistherm PH 10 or PH 20 (manufactured by Sumitomo Bayer Urethane Co., Ltd.) is added to the electrical insulating composition of this invention in terms of the resin content, heat life properties and resistance to thermal shock of enamelled wire are further improved.

By coating and baking the electrical insulating composition thus obtained on metal wire such as cooper and aluminum wire using a conventional method, enamelled wire having good heat resistance can be obtained.

This invention is illustrated in more detail by way of the following Examples in which all percents are by weight unless otherwise specified.

Comparative Example 1

| Ingredients | Grams | Moles |
| --- | --- | --- |
| Ethylene glycol | 128.3 | 2.07 |
| Glycerin | 92.0 | 1.00 |
| Dimethyl terephthalate | 554.8 | 2.86 |
| Gresol | 40.0 | |
| Tetrabutyl titanate (catalyst) | 0.8 | |

The above-mentioned ingredients were placed in a four-necked flask equipped with a thermometer, a stirrer, and a fractional distillation tube, and the temperature was raised to 170° C. in a nitrogen stream, and then to 230° C. at a rate of 10° C./hour. The reaction was conducted at 230° C. until a gelation time measured on a hot plate at 250° C. became 120 seconds or less. Subsequently a resin concentration was adjusted to 30% with a cresol/xylene (weight ratio=7/3) solution. To the resulting resin solution, tetrabutyl titanate in an amount of 5% based on the resin content and zinc naphthenate in an amount of 0.2% based on the resin content were added to give a varnish.

Comparative Example 2

| Ingredients | Grams | Moles |
| --- | --- | --- |
| Ethylene glycol | 100.5 | 1.62 |
| Tris(2-hydroxyethyl) isocyanurate | 381.6 | 1.46 |
| Dimethyl terephthalate | 517.9 | 2.67 |
| Tetrabutyl titanate (catalyst) | 1.0 | |
| Cresol | 176.5 | |

The above-mentioned ingredients were placed in a four-necked flask equipped with a stirrer, a thermometer, and a fractional distillation tube, and reacted in a nitrogen stream at 180°-200° C. until almost no methanol due to the reaction was distilled off. Subsequently, the temperature was raised to 220° C. and the reaction was continued at that temperature until a gelation time measured on a hot plate at 250° C. became 120 seconds or less. To the hot resin, cresol was added so as to make a resin concentration 30%. Further, the resin solution was maintained at 110° C. and tetrabutyl titanate was added gradually thereto in an amount of 5% based on the resin content and stirring was continued for 30 minutes to give a varnish.

EXAMPLE 1

(1) Synthesis of aromatic dialkyl diamidedicarboxylate

| Ingredients | Grams | Moles |
| --- | --- | --- |
| Monomethyl terephthalate | 301.4 | 1.670 |
| Tolylene diisocyanate | 145.7 | 0.835 |
| N-Methylpyrrolidone | 300.0 | |

The above-mentioned ingredients were placed in a four-necked flask equipped with a thermometer and a stirrer, and reacted at 100° C. for 3 hours in a nitrogen stream. Subsequently the temperature was raised to 150° C. and the reaction was continued at that temperature until no carbon dioxide was generated. After cooling to room temperature, a 5-fold amount of methanol was added to the reaction solution to give light yellow precipitate. The precipitate was filtered off and mixed with 2% aqueous NaOH with sufficient stirring, followed by sufficient washing with water and drying to give 300 g of dimethyl diamidecarboxylate. The product showed absorption of the amide bond at 3,310 cm$^{-1}$, 1,650 cm$^{-1}$ and 1,530 cm$^{-1}$ and did not show absorption of the isocyanate group in infrared spectra. The product had a melting point of 289°-292° C.

(2) Synthesis of polyesteramide

| Ingredients | Grams | Moles |
| --- | --- | --- |
| Ethylene glycol | 55.4 | 0.893 |
| Tris(2-hydroxyethyl) isocyanurate | 378.3 | 1.449 |
| 1,4-Cyclohexanedimethanol | 31.7 | 0.223 |
| Dimethyl terephthalate | 236.7 | 1.220 |
| Dimethyl diamidedicarboxylate obtained in the procedure (1) | 372.4 | 0.835 |
| Tetrabutyl titanate (catalyst) | 1.2 | |
| Cresol | 187.0 | |

The above-mentioned ingredients were placed in a four-necked flask equipped with a thermometer, a stirrer and a fractional distillation tube, and reacted at 180°-200° C. in a nitrogen stream until almost no methanol due to the reaction was distilled off. Subsequently the temperature was raised to 220° C. and the reaction was continued at that temperature until a gelation time measured on a hot plate at 250° C. became 120 seconds or less. To the hot resin, cresol was added so as to make a resin concentration 30%. Further, the resin solution was maintained at 110° C. and tetrabutyl titanate was added gradually thereto in an amount of 5% based on the resin content and stirring was continued for 30 minutes to give a varnish.

EXAMPLE 2

(1) Synthesis of aromatic dialkyl diamidedicarboxylate

| Ingredients | Grams | Moles |
| --- | --- | --- |
| Monomethyl terephthalate | 106.6 | 0.592 |
| 4,4'-Diphenylmethane diisocyanate | 74.0 | 0.296 |
| N-Methylpyrrolidone | 360.0 | |

The above-mentioned ingredients were placed in a four-necked flask equipped with a thermometer and a stirrer, and reacted in a nitrogen stream at 100° C. for 3 hours. Subsequently the temperature was raised to 150° C. and the reaction was continued at that temperature until no carbon dioxide was generated. After cooling to room temperature, a 5-fold amount of methanol was added to the reaction solution to give light yellow precipitate. The precipitate was filtered off and mixed with 2% aqueous NaOH with sufficient stirring, followed by sufficient washing with water and drying to give 132 g of dimethyl diamidedicarboxylate. The product showed absorption of the amide bond at 3,310 cm$^{-1}$, 1,650 cm$^{-1}$ and 1,530 cm$^{-1}$ and did not show absorption of the isocyanate group in infrared spectra. The product had a melting point of 289°–292° C.

(2) Synthesis of polyesteramide

| Ingredients | Grams | Moles |
| --- | --- | --- |
| Ethylene glycol | 47.1 | 0.760 |
| Glycerin | 38.1 | 0.414 |
| Dimethyl terephthalate | 134.1 | 0.691 |
| Dimethyl diamidedicarboxylate obtained in the procedure (1) | 154.5 | 0.296 |
| Tetrabutyl titanate (catalyst) | 0.4 | |
| Cresol | 120.0 | |

The above-mentioned ingredients were placed in a four-necked flask equipped with a thermometer, a stirrer and a fractional distillation tube, and reacted in a nitrogen stream at 180°–200° C. until almost no methanol due to the reaction was distilled off. Subsequently the temperature was raised to 220° C. and the reaction was continued at that temperature until a gelation time measured on a hot plate at 250° C. became 120 seconds or less. To the hot resin, N-methylpyrrolidone was added so as to make a resin concentration 30%. Further, the resin solution was maintained at 110° C. and tetrabutyl titanate in an amount of 5% based on the resin content and zinc naphthenate in an amount of 0.2% as the metal content based on the resin content were added thereto. Stirring was continued for 30 minutes to give a varnish.

EXAMPLE 3

| Ingredients | Grams | Moles |
| --- | --- | --- |
| (A) component | | |
| Monomethyl terephthalate | 109.3 | 0.607 |
| 4,4′-Diphenylmethane diisocyanate | 75.9 | 0.304 |
| N-Methylpyrrolidone | 123.5 | |
| (B) component | | |
| Ethylene glycol | 107.1 | 1.727 |
| Tris(2-hydroxyethyl) isocyanurate | 350.0 | 1.341 |
| Dimethyl terephthalate | 459.2 | 2.367 |
| Tetrabutyl titanate (catalyst) | 1.1 | |
| Cresol | 70.0 | |

The above-mentioned (A) component was placed in a four-necked flask equipped with a thermometer, a stirrer and a fractional distillation tube, and reacted in a nitrogen stream at 100° C. for 3 hours. Subsequently the temperature was raised to 150° C. and the reaction was continued at that temperature until no carbon dioxide was generated. Then (B) component was charged into the flask and reacted at 180°–200° C. until almost no methanol due to the reaction was distilled off. Subsequently, the temperature was raised to 220° C. and the reaction was conducted at that temperature until a gelation time measured on a hot plate at 250° C. became 120 seconds or less. To the hot resin, a mixed solvent of cresol/NISSEKI HISOL-100 (weight ratio=8/2) was added to make a resin concentration 30%. Further, the resin solution was maintained at 110° C. and tetrabutyl titanate was added gradually thereto in an amount of 5% based on the resin content and stirring was continued for 30 minutes to give a varnish.

EXAMPLE 4

| Ingredients | Grams | Moles |
| --- | --- | --- |
| Ethylene glycol | 71.8 | 1.158 |
| Tris(2-hydroxyethyl) isocyanurate | 350.0 | 1.341 |
| Dimethyl terephthalate | 288.5 | 1.487 |
| Dimethyl diamidedicarboxylate obtained in Example 2, procedure (1) | 349.7 | 0.670 |
| Tetrabutyl titanate (catalyst) | 1.1 | |
| Cresol | 198.0 | |

The above-mentioned ingredients were reacted using the same apparatus and the same procedure as described in Example 1, the procedure (2) to give a product having a gelation time of 60 seconds or less measured on a hot plate at 250° C. To the hot resin, a mixed solvent of cresol/NISSEKI HISOL-100 (weight ratio=8/2) was added to make a resin concentration 30%. Further, the resin solution was maintained at 110° C. and tetrabutyl titanate was added gradually thereto in an amount of 5% based on the resin content followed by addition of Desmodur CT-Stable (trademark, manufactured by Japan Polyurethane Industries, Ltd.) in an amount of 10% based on the resin content. Stirring was continued for 30 minutes to give a varnish.

EXAMPLE 5

| Ingredients | Grams | Moles |
| --- | --- | --- |
| (A) component | | |
| Monomethyl terephthalate | 362.0 | 2.01 |
| 4,4′-Diphenylmethane diisocyanate | 125.7 | 0.503 |
| Tolylene diisocyanate | 87.5 | 0.503 |
| N-Methylpyrrolidone | 575.2 | |
| (B) component | | |
| Ethylene glycol | 52.0 | 0.839 |
| Tris(2-hydroxyethyl) isocyanurate | 350.0 | 1.341 |
| Dimethyl terephthalate | 162.8 | 0.839 |
| Tetrabutyl titanate (catalyst) | 1.1 | |

The above-mentioned ingredients were reacted using the same apparatus and the same procedure as described in Example 3 to give a product having a gelation time of 60 seconds or less measured on a hot plate at 250° C. To the hot resin, N-methylpyrrolidone was added to make a resin concentration 30%. Further, the resin solution was maintained at 110° C. and tetrabutyl titanate was added gradually thereto in an amount of 5% based on the resin content followed by addition of Desmodur CT-Stable in an amount of 20% based on the resin content and zinc naphthenate in an amount of 0.2% as the metal content based on the resin content. Stirring was continued for 30 minutes to give a varnish.

EXAMPLE 6

| Ingredients | Grams | Moles |
| --- | --- | --- |
| (A) component | | |
| Monomethyl terephthalate | 546.3 | 3.035 |

| Ingredients | | Grams | Moles |
|---|---|---|---|
| | Tolylene diisocyanate | 264.0 | 1.517 |
| | N-Methylpyrrolidone | 810.0 | |
| (B) | component | | |
| | Ethylene glycol | 38.9 | 0.627 |
| | Tris(2-hydroxyethyl) isocyanurate | 326.9 | 1.252 |
| | Tetrabutyl titanate | 1.2 | |

The above-mentioned ingredients were reacted using the same apparatus and the same procedure as described in Example 3 to give a product having a gelation time of 120 seconds or less measured on a hot plate at 250° C. To the hot resin, cresol was added to make a resin concentration 30%. Further, the resin solution was maintained at 110° C. and tetrabutyl titanate was added gradually thereto in an amount of 8% based on the resin content followed by addition of Desmodur CT-Stable in an amount of 20% based on the resin content and zinc naphthenate in an amount of 0.2% as the metal content based on the resin content. Stirring was continued for 30 minutes to give a varnish.

EXAMPLE 7

| Ingredients | | Grams | Moles |
|---|---|---|---|
| (A) | component | | |
| | Monomethyl terephthalate | 516.5 | 2.869 |
| | 4,4'-Diphenylmethane diisocyanate | 179.4 | 0.718 |
| | m-Xylylene diisocyanate | 107.9 | 0.574 |
| | 1,6-Hexamethylene diisocyanate | 24.1 | 0.143 |
| | N-Methylpyrrolidone | 830.0 | |
| (B) | component | | |
| | Ethylene glycol | 36.7 | 0.592 |
| | Tris(2-hydroxyethyl) isocyanurate | 309.0 | 1.184 |

The above-mentioned ingredients were reacted using the same apparatus and the same procedure as described in Example 3 to give a product having a gelation time of 120 seconds or less measured on a hot plate at 250° C. Further, the resin solution was maintained at 110° C. and tetrabutyl titanate was added gradually thereto in an amount of 3% based on the resin content followed by addition of Desmodur CT-Stable in an amount of 5% based on the resin content and zinc naphthenate in an amount of 0.2% as the metal content based on the resin content. Stirring was continued for 30 minutes to give a varnish.

EXAMPLE 8

| Ingredients | | Grams | Moles |
|---|---|---|---|
| (A) | component | | |
| | Monomethyl isophthalate | 129.2 | 0.718 |
| | 4,4'-Diphenylmethane diisocyanate | 89.8 | 0.359 |
| | N-Methylpyrrolidone | 855.0 | |
| (B) | component | | |
| | Monomethyl terephthalate | 258.3 | 1.435 |
| | Isophorone diisocyanate | 63.5 | 0.287 |
| | Tolylene diisocyanate | 75.0 | 0.431 |
| (C) | component | | |
| | 1,4-Cyclohexanedimethanol | 84.1 | 0.592 |
| | Tris(2-hydroxyethyl) isocyanurate | 309.0 | 1.184 |
| | Terephthalic acid | 59.6 | 0.359 |
| | Dibutyl tin oxide | 9.0 | |

The above-mentioned (A) component was placed in a four-necked flask equipped with a thermometer, a stirrer and a fractional distillation tube and reacted in a nitrogen stream at 100° C. for 3 hours. Subsequently the temperature was raised to 150° C. and the reaction was continued at that temperature until no carbon dioxide was generated. Then the temperature was lowered to 50° C. and the (B) component was placed in the flask and reacted at 100° C. for 3 hours. Subsequently the temperature was raised to 150° C. and the reaction was proceeded at that temperature until no carbon dioxide was generated. In the next place, the (C) component was placed in the flask and reacted at 180°–200° C. until almost no methanol and water due to the reaction were distilled off. The reaction temperature was raised to 220° C. and the reaction was conducted at that temperature until a gelation time measured on a hot plate at 250° C. became 120 seconds or less. To the hot resin, cresol was added so as to make a resin concentration 30%. Further, the resin solution was maintained at 110° C. and tetrabutyl titanate was added gradually thereto in an amount of 5% based on the resin content followed by addition of Desmodur CT-Stable in an amount of 10% based on the resin content and zinc naphthenate in an amount of 0.2% as the metal content based on the resin content. Stirring was continued for 30 minutes to give a varnish.

The varnishes thus produced were coated on copper wire and baked according to a conventional method to give enamelled wire. Properties of enamelled wire were measured. The results are as shown in Table 1.

In Comparative Example 1 and Example 2, glycerin is used as the polyhydric alcohol component in each case, but Comparative Example 1, which has no amide bond in the main chain, shows negative result (failure) even at 4X as to the thermal shock resistance at 200° C.-1 hour, whereas Example 2, which has amide bonds in the main chain, shows affirmative result (pass) even at 1X as to the thermal shock resistance at 200° C.-1 hour, which is improved four times or more as great as Comparative Example 1. As to retention percent of dielectric breakdown voltage after deteriorating at 220° C. for 168 hours, Comparative Example 1 only shows 66.4%, whereas Example 2 shows as high as 93.5%.

On the other hand, tris(2-hydroxyethyl) isocyanurate is used as the polyhydric alcohol component in Comparative Example 2 and Example 1, but Comparative Example 2 shows negative result even at 4× as to the thermal shock resistance at 200° C.-1 hour and retention percent of only 15.6% in dielectric breakdown voltage after deteriorating at 240° C. for 168 hours, whereas Example 1, which has amide bonds in the main chain, shows pass at 2X as to the thermal shock resistance at 200° C.-1 hour, which is 2 times or more as great as Comparative Example 1, and retention percent of as high as 83.2% in dielectric breakdown voltage after deteriorating at 240° C. for 168 hours.

Such great improvements in thermal shock resistance and dielectric breakdown voltage after deterioration are caused by the introduction of amide bonds into the main chain, said amide bonds showing heat resistance. This can be shown, for example, by curves obtained by thermogravimetric analysis of the resins of Example 1 and Comparative Example 2. Further, weight retained on heating at 520° C. with a rate of temperature increase of 2.5° C./min was about 15% in Comparative Example 1, while about 35% in Example 2.

content. Stirring was continued for 30 minutes to give a varnish.

EXAMPLE 12

The same ingredients as used in Example 6 were

TABLE 1

| Example No. | Flexibility (wrapped) | Heat softening properties (load 2 kg) | Thermal shock resistance (200° C.-1 hour) | Abrasion resistance (times) (load 700 g) | Dielectric breakdown voltage (kV) | | |
|---|---|---|---|---|---|---|---|
| | | | | | Initial value | After 168 hours at 240° C. | Retention percent (%) |
| Comparative Example 1 | 1X OK | 180° C.-6 hr OK | 4X NG | 30 | 12.2 | 8.1(*1) | 66.4 |
| Comparative Example 2 | 1X OK | 200° C.-6 hr OK | 4X NG | 29 | 12.2 | 1.9 | 15.6 |
| Example 1 | 1X OK | 200° C.-6 hr OK | 2X OK | 36 | 13.7 | 11.4 | 83.2 |
| Example 2 | 1X OK | 200° C.-6 hr OK | 1X OK | 35 | 12.5 | 11.7(*1) | 93.5 |
| Example 3 | 1X OK | 200° C.-6 hr OK | 3X OK | 33 | 13.0 | 8.4 | 72.3 |
| Example 4 | 1X OK | 200° C.-6 hr OK | 2X OK | 35 | 13.0 | 11.0 | 84.6 |
| Example 5 | 1X OK | 200° C.-6 hr OK | 1X OK | 38 | 13.1 | 12.4 | 94.6 |
| Example 6 | 1X OK | 200° C.-6 hr OK | 1X OK | 42 | 13.4 | 12.7 | 94.7 |
| Example 7 | 1X OK | 200° C.-6 hr OK | 1X OK | 32 | 12.3 | 10.1 | 82.2 |
| Example 8 | 1X OK | 200° C.-6 hr OK | 1X OK | 30 | 12.3 | 9.6 | 78.0 |

Note) Diameter of wire: 1 mm; wire was coated with a varnish 8 times by passing through a die each time. Length of a furnace: 4 m Furnace temperature: entrance 260° C., middle 360° C. exit 420° C. Linear speed of coated wire for baking: 9 m/min
(*1)Measured after 168 hours at 220° C. Properties mentioned above were measured mainly according to JIS C-3003.

EXAMPLE 9

The procedure of Example 3 was repeated and after the addition of 5% of tetrabutyl titanate followed by stirring for 30 minutes, the temperature was lowered to 80° C. Subsequently Desmodur CT-Stable was added thereto in an amount of 10% based on the resin content and stirring was continued for 30 minutes to give a varnish.

EXAMPLE 10

The same ingredients as used in Example 4 were reacted using the same apparatus and the same procedure as described in Example 1, the procedure (2) to give a product having a gelation time of 60 seconds or less measured on a hot plate at 250° C. To the hot resin, a mixed solvent of cresol/NISSEKI HISOL-100 (weight ratio=8/2) was added to make a resin concentration 30%. Further, the resin solution was maintained at 110° C. and tetrabutyl titanate was added gradually thereto in an amount of 5% based on the resin content followed by addition of phenolic resin obtained in Referential Example 1 in an amount of 3% (as solid content) based on the resin content. Stirring was continued for 30 minutes. Subsequently, the temperature was lowered to 80° C. and Desmodur CT-Stable was added thereto in an amount of 15% based on the resin content followed by 20 minutes' stirring to give a varnish.

EXAMPLE 11

The same ingredients as used in Example 5 were reacted using the same apparatus and the same procedure as described in Example 3 to give a product having a gelation time of 60 seconds or less measured on a hot plate at 250° C. To the hot resin, N-methylpyrrolidone was added to make a resin concentration 30%. Further, the resin solution was maintained at 110° C. and tetrabutyl titanate was added gradually thereto in an amount of 5% based on the resin content followed by addition of zinc naphthenate in an amount of 0.2% (as the metal content) and polyhydantion (Resistherm PH 10, manufactured by Sumitomo Bayer Urethane Co.) in an amount of 20% as the solid content based on the resin reacted using the same apparatus and the same procedure as described in Example 3 to give a product having a gelation time of 120 seconds or less measured on a hot plate at 250° C. To the hot resin, cresol was added to make a resin concentration 30%. Further the resin solution was maintained at 110° C. and tetrabutyl titanate was added gradually thereto in an amount of 4% based on the resin conent followed by addition of polyhydantoin (Resistherm Ph 20, manufactured by Sumitomo Bayer Urethane Co.) in an amount of 30% (as the solid content) and zinc naphthenate in an amount of 0.2% (as the metal content) based on the resin content. Stirring was continued for 30 minutes. Subsequently, the temperature was lowered to 90° C. and Desmodur CT-Stable was added thereto in an amount of 10% based on the resin content followed by 20 minutes' stirring to give a varnish.

EXAMPLE 13

| Ingredients | Grams | Moles |
|---|---|---|
| (A) component | | |
| Monomethyl terephthalate | 516.5 | 2.869 |
| 4,4'-Diphenylmethane diisocyanate | 179.4 | 0.718 |
| m-Xylylene diisocyanate | 107.9 | 0.574 |
| 1,6-Hexamethylene diisocyanate | 24.1 | 0.143 |
| N-Methylpyrrolidone | 830.0 | |
| (B) component | | |
| Ethylene glycol | 36.7 | 0.592 |
| Tris(2-hydroxyethyl) isocyanurate | 309.0 | 1.184 |
| Tetraisopropyl titanate | 1.3 | |

The above-mentioned ingredients were reacted using the same apparatus and the same procedure as described in Example 3 to give a product having a gelation time of 120 seconds or less measured on a hot plate at 250° C. To the hot resin, N-methylpyrrolidone was added to make a resin concentration 30%. Further, the resin solution was maintained at 110° C. and tetrabutyl titanate was added gradually thereto in an amount of 3% based on the resin content followed by addition of Desmodur CT-Stable in an amount of 5% and zinc naphthenate in an amount of 0.2% (as the metal content) based on the resin content. Stirring was continued for 30 minutes to give a varnish.

REFERENTIAL EXAMPLE 1

Synthesis of Phenolic Resin

| Ingredients | Grams | Moles |
|---|---|---|
| Cresylic acid | 850 | 7.85 |
| Formaldehyde (37%) | 605 | 6.71 |
| Triethanolamine | 10 | 0.067 |

The above-mentioned ingredients were placed in a four-necked flask equipped with a thermometer, a stirrer and a reflux condenser, and refluxed at 98° C. for 90 minutes with stirring. Subsequently, the reflux condenser was taken off and the reaction was conducted at 50° C. under reduced pressure of 30–50 mmHg until a viscosity measured at 25° C. by diluting a resin sample with an equal amount of cresylic acid became 5–8 poise. The resulting resin was diluted with 900 g of cresylic acid to give a cresol-formaldehyde resin solution.

The varnishes thus produced were coated on copper wire and baked according to a conventional method to give enamelled wire. Properties of enamelled wire were measured and listed in Table 2.

proceeded at that temperature until a gelation time measured on a hot plate at 250° C. (the weight of the resin 0.2 g) became 120 seconds or less. To the resin obtained, cresol was added to make a resin concentration 30%. Further, the resin solution was maintained at 110° C. and tetrabutyl titanate was added thereto gradually in an amount of 5% based on the resin content. Stirring was continued for 30 minutes, followed by addition of Desmodur CT-Stable in an amount of 10% based on the resin content to give a varnish-like resin solution.

EXAMPLE 14

(1) Synthesis of aromatic dialkyl diamidedicarboxylate

| Ingredients | Grams | Moles |
|---|---|---|
| Monomethyl terephthalate | 301.4 | 1.670 |
| Tolylene diisocyanate | 145.7 | 0.835 |
| N-Methylpyrrolidone | 300 | |

The above-mentioned ingredients were placed in a four-necked flask equipped with a thermometer, a stirrer, and reacted in a nitrogen stream at 100° C. for 3 hours. Subsequently, the temperature was raised to 150° C. and the reaction proceeded at that temperature until no carbon dioxide was generated. After cooling to

TABLE 2

| Example No. | Example 9 | Example 10 | Example 11 | Example 12 | Example 13 |
|---|---|---|---|---|---|
| Flexibility (wrapped) | 1X OK | 1X OK | 1X OK | 1X OK | 1X OK |
| Heat softening properties (load 2 kg) | 200° C.-6 hr OK | 200° C.-6 hr OK | 200° C.-6 hr OK | 200° C.-6 hr OK | 200° C.-6 hr OK |
| Thermal shock resistance (200° C.- 1 hour) | 2X OK | 2X OK | 1X OK | 1X OK | 1X OK |
| Abrasion resistance (times) (load 700 g) | 32 | 35 | 39 | 42 | 32 |
| Dielectric breakdown voltage (kV) | | | | | |
| Initial value | 13.0 | 12.7 | 13.0 | 13.1 | 12.3 |
| After 168 hrs at 240° C. | 10.5 | 11.7 | 12.4 | 12.7 | 10.1 |
| Retention percent (%) | 80.8 | 92.1 | 95.4 | 96.9 | 82.2 |

Note) The treating conditions and the measuring method are the same as those described in the note of TABLE 1.

COMPARATIVE EXAMPLE 3

Synthesis of Esterimide

| Ingredients | Grams | Moles |
|---|---|---|
| 4,4'-Diaminodiphenylmethane | 47.0 | 0.237 |
| Trimellitic anhydride | 91.4 | 0.476 |
| Dimethyl terephthalate | 121.1 | 0.624 |
| Ethylene glycol | 34.5 | 0.556 |
| Tris(2-hydroxyethyl) isocyanurate | 141.7 | 0.543 |
| Tetrabutyl titanate (catalyst) | 0.4 | |
| Cresol | 75.5 | |
| Toluene | 40.0 | |

The above-mentioned ingredients were placed in a four-necked flask equipped with a thermometer, a stirrer, a fractional distillation tube, and a water content measuring device, and reacted in a nitrogen stream at 170° C. for 2 hours while refluxing toluene and removing the water produced by the production of imide groups. Subsequently, while distilling off the toluene, the temperature was raised to 230° C. The reaction room temperature, a 5-fold amount of methanol was added to the reaction solution to give light yellow precipitate. The precipitate was filtered off and mixed with 2% aqueous NaOH with sufficient stirring, followed by sufficient washing with water and drying to give 300 g of dimethyl diamidedicarboxylate. The product showed absorption of the amide bond at 3,310 cm$^{-1}$, 1,650 cm$^{-1}$ and 1,530 cm$^{-1}$ and did not show absorption of the isocyanate group in infrared spectra.

(2) Synthesis of imidedicarboxylic acid

| Ingredients | Grams | Moles |
|---|---|---|
| 4,4'-Diaminodiphenylmethane | 396.0 | 2.00 |
| Trimellitic anhydride | 768.0 | 4.00 |
| Cresol | 3492.0 | |
| Toluene | 200.0 | |

The above-mentioned ingredients were placed in a four-necked flask equipped with a thermometer, a stirrer, a fractional distillation tube, and a water content measuring device, and reacted in a nitrogen stream at 150°–170° C. for 2 hours while refluxing toluene and removing the water produced by the production of imide groups. Subsequently, while distilling off the toluene, the temperature was raised to 200° C. and maintained at 200° C. for 2 hours. The obtained imidedicarboxylic acid solution was cooled, filtered, washed with methanol, and dried to give yellow powder.

This powder showed absorption at 1770 cm$^{-1}$ due to the imide bond, which is characteristic in infrared spectra.

(3) Synthesis of polyesteramide

| Ingredients | Grams | Moles |
|---|---|---|
| Dimethyl diamidedicarboxylate obtained in the procedure (1) | 89.2 | 0.20 |
| Imidedicarboxylic acid obtained in the procedure (2) | 109.2 | 0.20 |
| Dimethyl terephthalate | 89.2 | 0.46 |
| Ethylene glycol | 34.6 | 0.56 |
| Tris(2-hydroxyethyl) isocyanurate | 135.8 | 0.52 |
| Tetrabutyl titanate | 0.4 | |
| Cresol | 196.3 | |

The above-mentioned ingredients were placed in a four-necked flask equipped with a thermometer, a stirrer and a fractional distillation tube, and reacted in a nitrogen stream while raising the temperature to 170° C., and then to 210° C. at a rate of 10° C./hour. The temperature was maintained at 210° C. and the reaction was stopped when a gelation time measured on a hot plate at 250° C. (the weight of the resin 0.2 g) became 120 seconds or less. The resulting resin solution was diluted to a resin concentration of 30% with a mixed solution of cresol/xylene (weight ratio=8/2). To the resin solution, tetrabutyl titanate in an amount of 5% based on the resin content, Desmodur CT-Stable in an amount of 10% based on the resin content and zinc naphthenate in an amount of 0.1% as the metal content based on the resin content were added to give a varnish.

EXAMPLE 15

| Ingredients | Grams | Moles |
|---|---|---|
| Dimethyl diamidedicarboxylate obtained in Example 14, procedure (1) | 178.4 | 0.40 |
| 4,4'-Diaminodiphenylmethane | 79.2 | 0.40 |
| Trimellitic anhydride | 153.6 | 0.80 |
| Ethylene glycol | 24.8 | 0.40 |
| Tris(2-hydroxyethyl) isocyanurate | 160.8 | 0.62 |
| Tetrabutyl titanate | 0.6 | |
| N-Methylpyrrolidone | 400.0 | |
| Toluene | 40.0 | |

The above-mentioned ingredients were placed in a four-necked flask equipped with a thermometer, a stirrer, a fractional distillation tube and a water content measuring device. The temperature was raised to 170° C. in a nitrogen stream and maintained at that temperature while refluxing toluene. The temperature was raised to 210° C. at a rate of 10° C./hour and maintained at 210° C. while distilling off the toluene. The reaction was stopped when a gelation time measured on a hot plate at 250° C. (the weight of the resin 0.2 g) became 120 seconds or less. The resulting resin solution was diluted to a resin concentration of 30% with a mixed solution of N-methylpyrrolidone/cresol (weight ratio=8/2). To the resin solution, tetrabutyl titanate in an amount of 5% based on the resin content, Desmodur CT-Stable in an amount of 10% based on the resin content and zinc naphthenate in an amount of 0.1% as the metal content based on the resin content were added to give a varnish.

EXAMPLE 16

| Ingredients | | Grams | Moles |
|---|---|---|---|
| (A) | component | | |
| | Monomethyl terephthalate | 109.3 | 0.607 |
| | 4,4'-Diphenylmethane diisocyanate | 75.9 | 0.304 |
| | N-Methylpyrrolidone | 123.5 | |
| (B) | component | | |
| | Ethylene glycol | 107.1 | 1.727 |
| | Tris(2-hydroxyethyl) isocyanurate | 350.0 | 1.341 |
| | Dimethyl terephthalate | 388.0 | 2.000 |
| | Imidedicarboxylic acid obtained in Example 14 | 200.4 | 0.367 |
| | Cresol | 70.0 | |
| | Tetrabutyl titanate | 1.2 | |

The above-mentioned (A) component was placed in a four-necked flask equipped with a thermometer, a stirrer and a fractional distillation tube, and reacted in a nitrogen stream at 100° C. for 2 hours. Subsequently, the temperature was raised gradually to 170° C. and maintained at 170° C. for 2 hours. When no carbon dioxide was generated, the (B) component was added to the flask and the temperature was raised to 210° C. and maintained at 210° C. The reaction was stopped when a gelation time measured on a hot plate at 250° C. (the weight of the resin 0.2 g) became 120 seconds or less. The resulting resin solution was diluted to a resin concentration of 30% with cresol. To the resin solution, tetrabutyl titanate in an amount of 5% based on the resin content, Desmodur CT-Stable in an amount of 10% based on the resin content, and zinc naphthenate in an amount of 0.2% as the metal content based on the resin content were added to give a varnish.

The varnishes thus produced were coated on copper wire and baked according to a conventional method to give enamelled wire. Properties of enamelled wire were measured and listed in Table 3.

TABLE 3

| Example No. | Comparative Example 2 | Comparative Example 3 | Example 14 | Example 15 | Example 16 |
|---|---|---|---|---|---|
| Flexibility (wrapped) | 1X OK | 1X OK | 1X OK | 1X OK | 1X OK |
| Heat softening properties (load 2 kg) | 200° C.-6 hr OK | 200° C.-6 hr OK | 200° C.-6 hr OK | 200° C.-6 hr OK | 200° C.-6 hr OK |
| Thermal shock resistance (200° C.-1 hour) | 4X NG | 1X OK | 1X OK | 1X OK | 1X OK |
| Abrasion resistance | | | | | |

TABLE 3-continued

| Example No. | Comparative Example 2 | Comparative Example 3 | Example 14 | Example 15 | Example 16 |
|---|---|---|---|---|---|
| (times) (load 700 g) | 32 | 19 | 37 | 40 | 32 |
| Dielectric break-down voltage (kV) | | | | | |
| Initial value | 12.2 | 12.5 | 13.0 | 13.0 | 12.8 |
| After 168 hrs at 240° C. | 1.9 | 11.9 | 12.4 | 12.5 | 11.6 |
| Retention % | 15.6 | 95.2 | 95.4 | 96.2 | 90.6 |

Note
The treating conditions and the measuring method are the same as those described in the note of Table 1 except for linear speed of coated wire for baking of 8 m/min in place of 9 m/min.

In Comparative Examples 2 and 3, tris(2-hydroxyethyl)isocyanurate is used as the polyhydric alcohol component in each case, but Comparative Example 2, which has no imide bond in the main chain, shows negative result (failure) even at 4X as to the thermal shock resistance at 200° C.-1 hour, whereas Comparative Example 3, which has imide bonds in the main chain, shows affirmative result (pass) even at 1X as to the thermal shock resistance at 200° C.-1 hour, which is improved four times or more as great as Comparative Example 2. As to retention percent of dielectric breakdown voltage after deteriorating at 240° C. for 168 hours, this being another important feature of heat resistant wire, Comparative Example 2 shows only 15.6%, while Comparative Example 3 is improved to 95.2%. As to abrasion resistance (the reciprocating method), however, which is another important index for mechanical properties, Comparative Example 2 shows 32 times, whereas Comparative Example 3 having imide groups in the main chain shows only 19 times, which is greatly lowered comparing with the former. On the other hand, Example 14, wherein amide groups as well as imide groups have been introduced into the main chain, shows affirmative result even at 1X as to the thermal shock resistance at 200° C.-1 hour, which is identical with Comparative Example 3 and is improved four times or more comparing with Comparative Example 2. As to retention percent of dielectric breakdown voltage after deteriorating at 240° C. for 168 hours, Example 14 shows 95.4%, which is identical with Comparative Example 3 and greatly improved comparing with 15.6% of Comparative Example 2.

As mentioned above, heat resistance is remarkably improved in Example 14 wherein amide groups and imide groups have been introduced into the main chain comparing with a conventional polyester and identical with the case of Comparative Example 3, wherein imide groups have been introduced into the main chain. As to abrasion resistance, Example 14 showing 37 times is rather improved comparing with 32 times of Comparative Example 2 and is remarkably improved comparing with 19 times of Comparative Example 3.

As is clear from the above-mentioned Examples, the introduction of the amide group into the main chain can give polyesteramide (polyesteramide-imide) having good mechanical properties while maintaining good heat resistance of the esterimide.

EXAMPLE 17

(1) Synthesis of aromatic dialkyl diamidedicarboxylate

| Ingredients | Grams | Moles |
|---|---|---|
| Monomethyl terephthalate | 301.4 | 1.670 |
| Tolylene diisocyanate | 145.7 | 0.835 |

-continued

| Ingredients | Grams | Moles |
|---|---|---|
| N-Methylpyrrolidone | 300.0 | |

The above-mentioned ingredients were placed in a four-necked flask equipped with a thermometer and a stirrer, and reacted in a nitrogen stream at 100° C. for 3 hours. Subsequently, the temperature was raised to 150° C. and the reaction proceeded at that temperature until no carbon dioxide was generated. After cooling to room temperature, a 5-fold amount of methanol was added to the reaction solution to give light yellow precipitate. The precipitate was filtered off and mixed with 2% aqueous NaOH with sufficient stirring, followed by sufficient washing with water and drying to give 300 g of dimethyl diamidedicarboxylate. The product showed absorption of the amide bond at 3,310 cm$^{-1}$, 1,650 cm$^{-1}$ and 1,530 cm$^{-1}$ and did not show absorption of the isocyanate group in infrared spectra.

(2) Synthesis of polyesteramide

| Ingredients | | Grams | Moles |
|---|---|---|---|
| (A) | component | | |
| | Tris(2-hydroxyethyl) isocyanurate | 224.0 | 0.858 |
| | Dimethyl diamidedicarboxylate obtained in the procedure (1) | 191.3 | 0.429 |
| | Tetrabutyl titanate (catalyst) | 0.8 | |
| | Cresol | 221.0 | |
| (B) | component | | |
| | Ethylene glycol | 51.0 | 0.822 |
| | Dimethyl terephthalate | 198.0 | 1.020 |

The above-mentioned (A) component was placed in a four-necked flask equipped with a thermometer, a stirrer, and a fractional distillation tube, and reacted in a nitrogen stream at 170° C. for 2 hours. Subsequently, the temperature was raised to 180° C. and the reaction was carried out at that temperature for 1 hour, followed by the reaction at 190° C. for 1 hour. The contents of the flask became almost transparent and uniform with the progress of the reaction. Then the temperature was raised to 200° C. and about 10 minutes after the temperature rise, the contents of the flask became completely uniform and transparent. The reaction was further carried out at 200° C.-205° C. until no methanol was distilled off. Then the temperature was lowered to 130° C. and the (B) component was placed in the flask. The reaction was carried out at 180°-200° C. until no methanol due to the reaction was distilled off and the temperature was raised to 220° C. The reaction was further carried out at that temperature until a gelation time measured on a hot plate at 250° C. became 120 seconds or less. To the hot resin, cresol was added to make a resin concentration 30%. Further, the resin solution was maintained at 110° C. and tetrabutyl titanate was gradually added thereto in an amount of 5% based on the resin content. Stirring was continued for 30 minutes to give a varnish.

EXAMPLE 18

(1) Synthesis of aromatic dialkyl diamidedicarboxylate

| Ingredients | Grams | Moles |
| --- | --- | --- |
| Monomethyl terephthalate | 106.6 | 0.592 |
| 4,4'-Diphenylmethane diisocyanate | 74.0 | 0.296 |
| N-Methylpyrrolidone | 360.0 | |

The above-mentioned ingredients were placed in a four-necked flask equipped with a thermometer and a stirrer, and reacted in a nitrogen stream at 100° C. for 3 hours. Subsequently, the temperature was raised to 150° C. and the reaction was continued at that temperature until no carbon dioxide was generated. After cooling to room temperature, a 5-fold methanol was added to the reaction solution to give light yellow precipitate. The precipitate was filtered off and mixed with 2% aqueous NaOH with sufficient stirring, followed by sufficient washing with water and drying to give 132 g of dimethyl diamidedicarboxylate. The product showed absorption of the amide bond at 3,310 cm$^{-1}$, 1,650 cm$^{-1}$ and 1,530 cm$^{-1}$ and did not show absorption of the isocyanate group in infrared spectra. The product had a melting point of 289°–292° C.

(2) SYNTHESIS OF POLYESTERAMIDE

| Ingredients | | Grams | Moles |
| --- | --- | --- | --- |
| (A) | component | | |
| | Tris(2-hydroxyethyl) isocyanurate | 107.0 | 0.410 |
| | Dimethyl diamidedicarboxylate obtained in the procedure (1) | 111.7 | 0.214 |
| | Tetraisopropyl titanate (catalyst) | 0.4 | |
| | N-Methylpyrrolidone | 132.0 | |
| (B) | component | | |
| | Ethylene glycol | 23.0 | 0.371 |
| | Dimethyl terephthalate | 92.3 | 0.476 |

The above-mentioned (A) component was placed in a four-necked flask equipped with a thermometer, a stirrer and a fractional distillation tube, and reacted in a nitrogen stream at 170° C. for 2 hours. Subsequently the temperature was raised to 180° C. and the reaction was continued at that temperature for 1 hour, followed by the reaction at 190° C. for 1 hour. The mixture in the flask became almost transparent and uniform with the progress of the reaction. Then the temperature was raised to 200° C. and about 10 minutes after the temperature rise, the contents of the flask became completely transparent and uniform. The reaction was further carried out at 200°–205° C. until no methanol was distilled off. Then, the temperature was lowered to 130° C. and the (B) component was placed in the flask. The reaction was carried out at 180°–200° C. until no methanol due to the reaction was distilled off and the temperature was raised to 220° C. The reaction was further carried out at that temperature until a gelation time measured on a hot plate at 250° C. became 120 seconds or less. To the hot resin, N-methylpyrrolidone was added to make a resin concentration 30%. Further, the resin solution was maintained at 110° C. and tetrabutyl titanate in an amount of 5% based on the resin content and zinc naphthenate in an amount of 0.2% as the metal content based on the resin content were added thereto. Stirring was continued for 30 minutes to give a varnish.

EXAMPLE 19

| Ingredients | | Grams | Moles |
| --- | --- | --- | --- |
| (A) | component | | |
| | Monomethyl terephthalate | 154.0 | 0.856 |
| | 4,4'-Diphenylmethane diisocyanate | 53.5 | 0.214 |
| | Xylene diisocyanate | 40.2 | 0.214 |
| | N-Methylpyrrolidone | 200.0 | |
| (B) | component | | |
| | Tris(2-hydroxyethyl) isocyanurate | 201.1 | 0.770 |
| | Tetrabutyl titanate (catalyst) | 0.85 | |
| (C) | component | | |
| | Ethylene glycol | 53.3 | 0.860 |
| | Dimethyl terephthalate | 198.0 | 1.020 |

The above-mentioned (A) component was placed in a four-necked flask equipped with a thermometer, a stirrer and a fractional distillation tube, and reacted in a nitrogen stream at 100° C. for 3 hours. Subsequently, the temperature was raised to 150° C. and the reaction was continued at that temperature until no carbon dioxide was generated. Subsequently the (B) component was placed in the flask and reacted at 170° C. for 2 hours. Subsequently, the temperature was raised to 180° C. and the reaction was continued at that temperature for 1 hour, followed by the reaction at 190° C. for 1 hour. The mixture of the flask became almost transparent and uniform with the progress of the reaction. Then the temperature was raised to 200° C. and about 10 minutes after the temperature rise, the contents of the flask became completely uniform and transparent. The reaction was further carried out at 200°–205° C. until no methanol was distilled off. Then, the temperature was lowered to 130° C. and the (C) component was placed in the flask. The reaction was carried out at 180°–200° C. until no methanol due to the reaction was distilled off and the temperature was raised to 220° C. The reaction was further carried out at that temperature until a gelation time measured on a hot plate at 250° C. became 120 seconds or less. To the hot resin, cresol was added to make a resin concentration 30%. Further, the resin solution was maintained at 110° C. and tetrabutyl titanate was added gradually thereto in an amount of 3% based on the resin content, followed by the addition of Desmodur CT-Stable in an amount of 5% based on the resin content and zinc naphthenate in an amount of 0.2% as the metal content based on the resin content. Stirring was continued for 30 minutes to give a varnish.

The varnishes thus produced were coated on copper wire and baked according to a conventional method to give enamelled wire. Properties of enamelled wire were measured and listed in Table 4.

TABLE 4

| Example No. | Comparative Example 2 | Example 17 | Example 18 | Example 19 |
|---|---|---|---|---|
| Flexibility (wrapped) | 1X OK | 1X OK | 1X OK | 1X OK |
| Heat softening | 200° C.-6 hr | 200° C.-6 hr | 200° C.-6 hr | 200° C.-6 hr |
| Thermal shock resistance (200° C.- 1 hour) | 4X NG | 2X OK | 2X OK | 2X OK |
| Abrasion resistance (times) (load 700 g) | 29 | 31 | 33 | 33 |
| Dielectric breakdown voltage (kV) | | | | |
| Initial Value | 12.2 | 13.5 | 13.4 | 13.8 |
| After 168 hrs at 240° C. | 1.9 | 11.3 | 11.6 | 10.9 |
| Retention % | 15.6 | 83.7 | 86.6 | 79.0 |

Note
The treating conditions and the measuring method are the same as those described in the note of Table 1.

As shown in Table 4, Comparative Example 2, wherein there is no amide bond in the main chain, shows negative result (failure) even at 4X as to the thermal shock resistance at 200° C.-1 hour and only 15.6% as to retention percent of dielectric breakdown voltage after deteriorating at 240° C. for 168 hours. On the other hand, Examples 17, 18 and 19, wherein there are amide bonds in the main chain, show affirmative results (pass) at 2X as to the thermal shock resistance, which is improved two times or more comparing with Comparative Example 2, and show remarkably improved values of 83.7–79.0% as to the retention percent of dielectric breakdown voltage after deteriorating at 240° C. for 168 hours.

Such great improvements in thermal shock resistance and dielectric breakdown voltage after deterioration are caused by the introduction of amide bonds which show heat resistance into the main chain. This can be shown, for example, by curves obtained by thermogravimetric analysis of the resins of Example 17 and Comparative Example 2 with a rate of temperature increase of 2.5° C./min. Weight retained on heating at 520° C. was about 15% in Comparative Example 2, while about 35% in Example 17.

EXAMPLE 20

(1) Synthesis of aromatic dialkyl diamidedicarboxylate

| Ingredients | Grams | Moles |
|---|---|---|
| Monomethyl terephthalate | 106.6 | 0.592 |
| 4,4'-Diphenylmethane diisocyanate | 74.0 | 0.296 |
| N-Methylpyrrolidone | 360.0 | |

The above-mentioned ingredients were placed in a four-necked flask equipped with a thermometer, and a stirrer, and reacted in a nitrogen stream at 100° C. for 3 hours. Subsequently, the temperature was raised to 150° C. and the reaction was continued at that temperature until no carbon dioxide was generated. After cooling to room temperature, a 5-fold amount of methanol was added to the reaction solution to give light yellow precipitate. The precipitate was filtered off and mixed with 2% aqueous NaOH with sufficient stirring, followed by sufficient washing with water and drying to give 132 g of dimethyl diamidedicarboxylate. The product showed absorption of the amide group at 3,310 cm$^{-1}$, 1,650 cm$^{-1}$ and 1,530 cm$^{-1}$ and did not showed absorption of the isocyanate group in infrared spectra. The product had a melting point of 289°–292° C.

(2) SYNTHESIS OF POLYESTERAMIDE

| Ingredients | Grams | Moles |
|---|---|---|
| (A) component | | |
| Tris(2-hydroxyethyl) isocyanurate | 350.0 | 1.341 |
| Dimethyl diamidedicarboxylate obtained in the procedure (1) | 420.1 | 0.805 |
| N-Methylpyrrolidone | 740.0 | |
| Tetrabutyl titanate (catalyst) | 2.1 | |
| (B) component | | |
| Poly(ethylene terephthalate) having intrinsic viscosity of 0.6 | 213.0 | |

The above-mentioned (A) component was placed in a four-necked flask equipped with a thermometer, a stirrer, and a fractional distillation tube and reacted in a nitrogen stream at 180°–200° C. until almost no methanol due to the reaction was distilled off. Subsequently, the temperature was raised to 210° C. and the (B) component was added to the flask gradually. The temperature was gradually raised to 220° C. and the reaction was continued at that temperature until a gelation time measured on a hot plate at 250° C. became 120 seconds or less to give a transparent viscous solution. To the hot resin, N-methylpyrrolidone was added to make a resin concentration 30%. Further, the resin solution was maintained at 110° C. and tetrabutyl titanate was added gradually thereto in an amount of 5% based on the resin content, followed by addition of zinc naphthenate in an amount of 0.2% as the metal content based on the resin content. Stirring was continued for 30 minutes to give a varnish.

EXAMPLE 21

| Ingredients | Grams | Moles |
|---|---|---|
| (A) component | | |
| Monomethyl terephthalate | 362.2 | 2.012 |
| 4,4'-Diphenylmethane diisocyanate | 125.7 | 0.503 |
| Tolylene diisocyanate | 87.5 | 0.503 |
| N-Methylpyrrolidone | 580.0 | |
| (B) component | | |
| Tris(2-hydroxyethyl) isocyanurate | 350.0 | 1.341 |
| Dibutyl tin oxide | 5.7 | |
| (C) component | | |
| Poly(1,4-cyclohexanedicar- | | |

| Ingredients | Grams | Moles |
|---|---|---|
| binyl terephthalate) (intrinsic viscosity 0.6) | 228.0 | |

The above-mentioned (A) component was placed in a four-necked flask equipped with a thermometer, a stirrer and a fractional distillation tube and reacted in a nitrogen stream at 100° C. for 3 hours. Subsequently, the temperature was raised to 150° C. and the reaction was continued at that temperature until no carbon dioxide was generated. Then, the (B) component was placed in the flask and the reaction was conducted at 180°–200° C. until almost no methanol due to the reaction was distilled off. Subsequently, the temperature was raised to 210° C. and the (C) component was added thereto gradually. The temperature was raised slowly to 220° C. and the reaction was continued at that temperature until a gelation time measured on a hot plate at 250° C. became 120 seconds or less to give a transparent viscous solution. To the hot resin, cresol was added to make a resin concentration 30%. Further, the resin solution was maintained at 110° C. and tetrabutyl titanate was added gradually thereto in an amount of 5% based on the resin content, followed by addition of the phenolic resin produced by the following method in an amount of 5% and zinc naphthenate in an amount of 0.2% as the metal content based on the resin content. Stirring was continued for 30 minutes to give a varnish.

Synthesis of phenolic resin

| Ingredients | Grams | Moles |
|---|---|---|
| Cresol | 432.4 | 4.0 |
| Formaldehyde (40%) | 288.6 | 3.2 |
| Triethanolamine | 6.0 | |

The above-mentioned ingredients were placed in a four-necked flask equipped with a thermometer, a stirrer and a reflux condenser, and refluxed at 95° C. for 90 minutes with stirring. Subsequently, the temperature was lowered to 50° C. The reaction was continued under reduced pressure of 50 mmHg by raising the temperature to 115° C. while dehydrating. When the viscosity of the resin solution measured by diluting a resin sample with an equal amount of cresylic acid at 25° C. became S - U in Gardner viscosity, 400 g of cresylic acid was added to the reaction solution to give a phenolic resin solution.

EXAMPLE 22

| Ingredients | Grams | Moles |
|---|---|---|
| (A) component | | |
| Monomethyl terephthalate | 289.6 | 1.609 |
| Tolylene diisocyanate | 70.0 | 0.402 |
| 4,4'-Diphenylmethane diisocyanate | 100.6 | 0.402 |
| N-Methylpyrrolidone | 306.7 | |
| (B) component | | |
| Tris(2-hydroxyethyl) isocyanurate | 350.0 | 1.341 |
| Tetrabutyl titanate | 2.0 | |
| (C) component | | |
| Poly(ethylene terephthalate) (Polyester Chip, manuf. by Nasu Sangyo K.K.) | 238.4 | |

The above-mentioned (A) component was placed in a four-necked flask equipped with a thermometer, a stirrer and a fractional distillation tube, and reacted in a nitrogen stream at 100° C. for 3 hours. Subsequently, the temperature was raised to 150° C. and the reaction was continued at that temperature until no carbon dioxide was generated. Then the (B) component was placed in the flask and reacted at 180°–200° C. until almost no methanol due to the reaction was distilled off. Subsequently, the temperature was raised to 210° C. and the (C) component was gradually added to the flask. The temperature was slowly raised to 220° C. and the reaction was conducted at that temperature until a gelation time measured on a hot plate at 250° C. became 120 seconds or less to give a transparent viscous solution. To the hot resin, a mixed solution of cresol/NISSEKI HISOL-100 (weight ratio=8/2) was added to make a resin concentration 30%. Further, the resin solution was maintained at 110° and tetrabutyl titanate was added gradually thereto in an amount of 5% based on the resin content, followed by addition of zinc naphthenate in an amoutn of 0.2% as the metal content based on the resin content. Stirring was continued for 30 minutes to give a varnish.

EXAMPLE 23

| Ingredients | Grams | Moles |
|---|---|---|
| (A) component | | |
| Monomethyl terephthalate | 668 | 3.710 |
| 4,4'-Diphenylmethane diisocyanate | 463 | 1.855 |
| N-Methylpyrrolidone | 1700 | |
| (B) component | | |
| Tris(2-hydroxyethyl) isocyanurate | 968 | 3.709 |
| Tetrabutyl titanate | 4 | |
| (C) component | | |
| Poly(ethylene terephthalate) (Polyester Chip, manuf. by Nasu Sangyo K.K.) | 940 | |

The above-mentioned (A) component was placed in a four-necked flask equipped with a thermometer, a stirrer and a fractional distillation tube, and reacted in a nitrogen stream at 100° C. for 3 hours. Subsequently, the temperature was raised to 150° C. and the reaction was continued at that temperature until no carbon dioxide was produced. Then the (B) component was placed in the flask and reacted at 180°–200° C. until almost no methanol due to the reaction was distilled off. Then the temperature was raised to 205° C. and the (C) component was added gradually to the flask. The temperature was slowly raised to 220° C. and the reaction was conducted at that temperature until a gelation time measured on a hot plate at 250° C. became 60 seconds or less to give a transparent viscous solution. To the hot resin, cresol was added to make a resin concentration 30%. Further, the resin solution was maintained at 110° C. and tetrabutyl titanate was gradually added thereto in an amount of 5% based on the resin content, followed by addition of Demosdur CT-Stable in an amount of 10% and zinc naphthenate in an amount of 0.2% as the metal content based on the resin content. Stirring was continued for 30 minutes to give a varnish.

The varnishes thus produced were coated on copper wire and baked according to a conventional method to give enamelled wire. Properties of enamelled wire were measured and listed in Table 5.

TABLE 5

| Example No. | Comparative Example 2 | Example 20 | Example 21 | Example 22 | Example 23 |
|---|---|---|---|---|---|
| Flexibility (wrapped) | 1X OK | 1X OK | 1X OK | 1X OK | 1X OK |
| Heat softening properties (load 2 kg) | 200° C.-6 hr OK | 200° C.-6 hr OK | 200° C.-6 hr OK | 200° C.-6 hr OK | 200° C.-6 hr OK |
| Thermal shock resistance (200° C.-1 hour) | 4X NG | 1X OK | 1X OK | 2X OK | 2X OK |
| Abrasion resistance (times) (load 700 g) | 32 | 42 | 37 | 32 | 32 |
| Dielectric breakdown voltage (kV) | | | | | |
| Initial value | 12.2 | 12.8 | 12.6 | 13.2 | 13.6 |
| After 168 hrs at 240° C. | 1.9 | 11.0 | 10.8 | 11.3 | 10.8 |
| Retention % | 15.6 | 85.9 | 85.7 | 85.6 | 79.4 |

Note
The treating conditions and the measuring method are the same as those described in the note of Table 3.

As shown in Table 5, Comparative Example 2, wherein there is no amide bond in the main chain, shows negative result (failure) even at 4X as to the thermal shock resistance at 200° C.-1 hour and only 15.6% as to retention percent of dielectric brakdown voltage after deteriorating at 240° C. for 168 hours. On the other hand, Examples 20, 21, 22 and 23, wherein there are amide bonds in the main chain, show affirmative results (pass) at 1X or 2X as to the thermal shock resistance, which is improved two times or more comparing with Comparative Example 2, and show remarkably improved values of 85.9–79.4% as to the retention percent of dielectric breakdown voltage after deteriorating at 240° C. for 168 hours.

Such great improvements in thermal shock resistance and dielectric breakdown voltage after deterioration are caused by the introduction of amide bonds which show heat resistance into the main chain This can be shown, for example, by curves obtained by thermogravimetric analysis of the resins of Example 20 and Comparative Example 2 with a rate of temperature increase of 2.5° C./min. Weight retained on heating at 520° C. was about 15% in Comparative Example 2, while about 35% in Example 20.

What is claimed is:

1. A process for producing a polyesteramide which comprises
   (i) reacting one or more aromatic monoalkyl dicarboxylates of the formula:

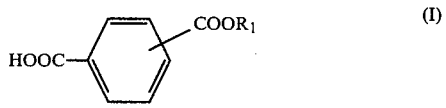

(I)

wherein $R_1$ is alkyl; with one or more aromatic diisocyanates in the presence or absence of one or more monoalkyl dicarboxylates and/or one or more diisocyanates to produce an aromatic dialkyl diamidedicarboxylate of the formula:

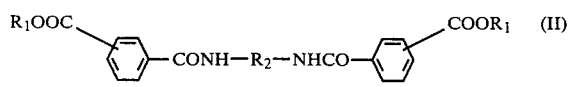

(II)

wherein $R_1$ is as defined above; and $R_2$ is a divalent aromatic residue, or to produce a mixture (III) of dialkyl diamidedicarboxylates containing the aromatic dialkyl diamidedicarboxylate of the formula (II), and
   (ii) reacting the aromatic dialkyl diamidedicarboxylate of the formula (II) or a mixture (III) of dialkyl diamidedicarboxylates containing the aromatic dialkyl diamidedicarboxylate of the formula (II) with one member selected from the group consisting of
   (a) one or more polyhydric alchols,
   (b) one or more polyhydric alcohols and one or more polyvalent carboxylic acids or esters thereof, and
   (c) one or more polyhydric alcohols and a linear polyester.

2. A process according to claim 1, wherein the aromatic monoalkyl dicarboxylate of the formula (I) is monomethyl or monoethyl terephthalate or isophthalate.

3. A process according to claim 1, wherein the aromatic diisocyanate is 4,4'-diphenylmethane diisocyanate, tolylene diisocyanate, xylylene diisocyanate or a blocked isocyanate thereof.

4. A process according to claim 1, wherein the amount of the aromatic dialkyl diamidedicarboxylate of the formula (II) alone or in the mixture (III) of dialkyl diamidedicarboxylates containing the compound of the formula (II) is 15 equivalent % or more based on the total amount of the acid component.

5. A process according to claim 1, wherein 40 equivalent % or more of tris(2-hydroxyethyl) isocyanurate is present in the polyhydric alcohol.

6. A process according to claim 1, wherein the polyhydric alcohol in the component (a), (b) or (c) is tris(2-hydroxyethyl) isocyanurate.

7. A process according to claim 1, wherein 1.0 mole of the aromatic dialkyl diamidedicarboxylate of the formula (II) alone or in the mixture (III) is reacted with 1.3–2.0 moles of tris(2-hydroxyethyl) isocyanurate followed by the reaction with one or more polyhydric alcohols and polyvalent carboxylic acids.

8. A process according to claim 1, wherein the aromatic dialkyl diamidedicarboxylate of the formula (II) alone or in the mixture (III) in an amount of 15 equivalent % or more based on the total amount of the acid component is reacted with tris(2-hydroxyethyl) isocyanurate in an amount of 40 equivalent % or more based on the total amount of the alcohol component and at least one polyvalent carboxylic acid in an amount of 85 equivalent % or less based on the total amount of the acid component.

9. A process according to claim 1, 7 or 8, wherein the polyvalent carboxylic acid is terephthalic acid or its lower alkyl ester or isophthalic acid or its lower alkyl ester.

10. A process according to claim 1, or 6, wherein the polyvalent carboxylic acid is an imidedicarboxylic acid of the formula:

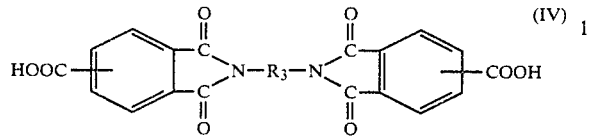

wherein $R_3$ is a divalent organic group.

11. A process according to claim 10, wherein the imidedicarboxylic acid is

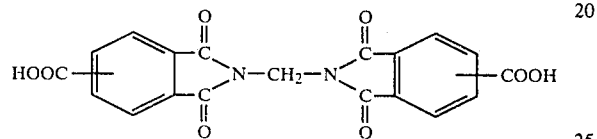

12. A process according to claim 10, wherein the aromatic dialkyl diamidedicarboxylate of the formula (II) alone or in the mixture (III) in an amount of 10–95 equivalent % based on the total amount of the acid compound and the imidedicarboxylic acid of the formula (IV) in an amount of 5–50 equivalent % based on the total amount of the acid component are used and an alcohol surplus percentage of the polyhydric alcohol in the range of 5–80% is applied to the second step reaction.

13. A process according to claim 1, wherein the linear polyester is a polymer or copolymer of terephthalic acid or its derivative or isophthalic acid or its derivative and ethylene glycol.

14. A process according to claim 1, 6 or 13, wherein 10–45% by weight of the aromatic dialkyl diamidedicarboxylate of the formula (II) or the mixture (III), 25–45% by weight of tris(2-hydroxyethyl) isocyanurate and 10–65% by weight of the linear polyester, the total being 100% by weight, are reacted in the second step reaction.

15. A process according to claim 1, 2 or 3, wherein the first step reaction is carried out at a temperature of 80° C.–240° C. in a solvent.

16. A process according to claim 1, 7, 8 or 12, wherein the second step reaction is carried out at a temperature of 160° C.–250° C.

17. A polyesteramide obtained by reacting in the first step one or more aromatic monoalkyl dicarboxylates of the formula:

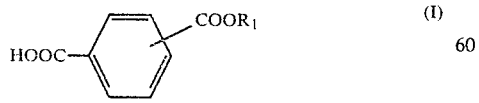

wherein $R_1$ is alkyl; with one or more aromatic diisocyanates in the presence or absence of one or more monoalkyl dicarboxylates and/or one or more diisocyanates to produce an aromatic dialkyl diamidedicarboxylate of the formula:

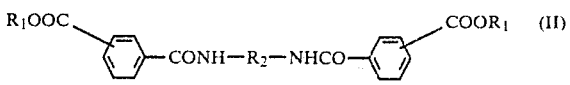

wherein $R_1$ is as defined above; and $R_2$ is a divalent aromatic residue, or to produce a mixture (III) of dialkyl diamidedicarboxylates containing the aromatic dialkyl diamidedicarboxylate of the formula (II), and reacting in the second step the aromatic dialkyl of diamidedicarboxylate of the formula (II) or a mixture (III) of dialkyl diamidedicarboxylates containing the aromatic dialkyl diamidedicarboxylate of the formula (II) with one member selected from the group consisting of
  (a) one or more polyhydric alcohols,
  (b) one or more polyhydric alcohols and one or more polyvalent carboxylic acids or esters thereof, and
  (c) one or more polyhydric alcohols and a linear polyester.

18. An electrical insulating composition which comprises as a main component an polyesteramide produced by reacting in the first step one or more aromatic monoalkyl dicarboxylates of the formula:

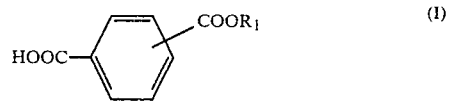

wherein $R_1$ is alkyl; with one or more aromatic diisocyanates in the presence or absence or one or more monoalkyl dicarboxylates and/or one or more diisocyanates to produce an aromatic dialkyl diamidedicarboxylate of the formula:

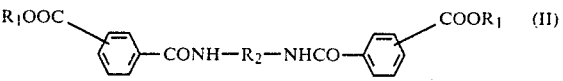

wherein $R_1$ is as defined above; and $R_2$ is a divalent aromatic residue, or to produce a mixture (III) of dialkyl diamidedicarboxylates containing the aromatic dialkyl diamidedicarboxylate of the formula (II), and reacting in the second step the aromatic dialkyl diamidedicarboxylate of the formula (II) or a mixture (III) of dialkyl diamidedicarboxylates containing the aromatic dialkyl diamidedicarboxylate of the formula (II) with one member selected from the group consisting of
  (a) one or more polyhydric alcohols,
  (b) one or more polyhydric alcohols and one or more polyvalent carboxylic acids or esters thereof, and
  (c) one or more polyhydric alcohols and a linear polyester.

19. An electrical conductor having an insulating coating consisting essentially of a polyesteramide resin prepared by reacting in the first step one or more aromatic monoalkyl dicarboxylates of the formula:

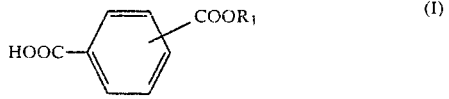

wherein $R_1$ is alkyl; with one or more aromatic diisocyanates in the presence or absence of one or more monoalkyl dicarboxylates and/or one or more diisocyanates to produce an aromatic dialkyl diamidedicarboxylate of the formula:

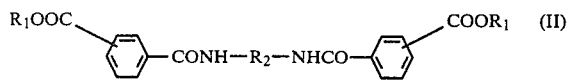

wherein $R_1$ is as defined above; and $R_2$ is a divalent aromatic residue, or to produce a mixture (III) of dialkyl diamidedicarboxylates containing the aromatic dialkyl diamidedicarboxylate of the formula (II), and reacting in the second step the aromatic dialkyl diamidedicarboxylate of the formula (II) or a mixture (III) of dialkyl diamidedicarboxylates containing the aromatic dialkyl diamidedicarboxylate of the formula (II) with one member selected from the group consisting of
  (a) one or more polyhydric alcohols,
  (b) one or more polyhydric alcohols and one or more polyvalent carboxylic acid, and
  (c) one or more polyhydric alcohols and a linear polyester.

20. A process according to claim 1, wherein monomethyl terephthalate is initially reacted with a mixture of 4,4'-diphenylmethane diisocyanate and tolylene diisocyanate to form an aromatic dialkyl diamidedicarboxylate which is subsequently reacted with a mixture of ethylene glycol and tris(2-hydroxyethyl)isocyanurate and dimethyl terephthalate.

21. A polyesteramide according to claim 17, which is obtained by reacting monomethyl terephthalate with 4,4'-diphenylmethane diisocyanate and tolylene diisocyanate and thereafter the resulting reaction product is reacted with ethylene glycol, tris(2-hydroxyethyl)isocyanurate and dimethyl terephthalate.

22. The electrical insulating composition of claim 18, wherein said polyesteramide is produced by reacting monomethyl terephthalate with 4,4'-diphenylmethane diisocyanate and tolylene diisocyanate to provide a reaction product containing an aromatic dialkyl diamidedicarboxylate and this aromatic dialkyl diamidedicarboxylate is subsequently reacted with ethylene glycol, tris(2-hydroxyethyl) isocyanurate and dimethyl terephthalate.

* * * * *